United States Patent Office 3,228,834
Patented Jan. 11, 1966

3,228,834
PHARMACEUTICAL DILUENT COMPOSITIONS
Eugene Howard Gans, Hastings on Hudson, N.Y., and Harold Leon Newmark, Maplewood, N.J., assignors to Hoffmann-La Roche Inc., Nutley, N.J., a corporation of New Jersey
No Drawing. Filed June 8, 1962, Ser. No. 200,923
7 Claims. (Cl. 167—58)

The instant invention relates to diluents for dissolving a medicament for parenteral injection. More particularly, the invention relates to diluents for chlordiazepoxide and to solutions thereof suitable for parenteral injection.

This application is a continuation-in-part application of Serial No. 145,492, filed October 16, 1961, entitled "Pharmaceutical Diluent Compositions" to Eugene Howard Gans and Harold Leon Newmark (now abandoned). Chlordiazepoxide (7-chloro-2-methylamino - 5 - phenyl-3H-1,4-benzodiazepine-4-oxide) is a very useful medicament; being used, for example, to relieve tension and anxiety. The use of chlordiazepoxide in solution for parenteral application is a desirable method of application of the drug where the patient is unable to take oral medication, for example, in unconscious patients or violent psychopaths, or where immediate onset of action is desired. However, heretofore attempts to form parenteral solutions of chlordiazepoxide have been unsuccessful due to the inherent instability of chlordiazepoxide and its hydrochloride salt in the presence of water. Furthermore, when aqueous solutions of the hydrochloride salt are injected intramuscularly, painful local reactions frequently occur. Additionally, the hydrochloride salt in sample aqueous solutions, while active by the intraperitioneal and intravenous routes, is not satisfactorily active intramuscularly or subcutaneously.

It has now been discovered that an aqueous diluent for chlordiazepoxide which contains maleic acid, a parenteral surfactant, and a stabilizing agent is capable of dissolving chlordiazepoxide or the hydrochloric salt thereof to form a relatively stable solution of chlordiazexpoxide wherein the solubility of chlordiazepoxide in the diluent is much higher than in aqueous solutions without the above ingredients. Additionally, the solutions can be injected intramuscularly with substantially no local irritation and the solutions are active intramuscularly and subcutaneously, as well as intravenously and intraperitoneally.

One aspect of the invention, accordingly, relates to diluents for chlordiazepoxide (and the hydrochloride salt thereof) suitable for parenteral injection wherein the diluents contain from about 0.25 to about 2.5 percent, preferably from about 0.8 to about 2.0 percent, of maleic acid; from about 0.5 to about 8 percent, preferably from about 1 to about 8 percent, of surfactant; and from about 5 to about 50 percent, preferably from about 10 to about 20 percent, of stabilizing agent; with the remainder being water. The above percentages are based on the total weight of the aqueous diluent solution. It is also desirable, although not essential, to employ from about 0.01 to about 2 percent of preservative.

The surfactants employed in the diluents of the invention are polyoxyethylene derivatives; two types of which can be employed:

(a) A solid block polymer having a molecular weight of about 8750 and composed of 80 percent by weight of polyoxyethylene groups and 20 percent by weight of polyoxypropylene groups, wherein the polyoxyethylene groups are in the terminal portions of the molecules (Pluronic F-68, Wyandotte Chemicals Corp., Wyandotte, Michigan), and, (b) Polyoxyethylene sorbitan monoesters of higher aliphatic or olefinic monocarboxylic acids, e.g. polysorbate 20 (polyoxyethylene sorbitan monolaurate) and polysorbate 80 (polyoxyethylene sorbitan mono-oleate).

The upper limit of surfactant employed depends on the particular surfactant; for example, with polysorbate 80 and Pluronic F-68 the upper limit is about 8 percent, with from 2 to about 6 percent being preferred; with polysorbate 20 the upper limit is about 4 percent. Four percent polysorbate 80 or Pluronic F-68 is preferred in the practice of the invention. A necessary characteristic of the surfactant is, of course, that is be parenterally acceptable.

The stabilizing agents employed in the diluents of the invention are hydroxy-containing aliphatic compounds, e.g. $C_2$ to $C_6$ alkanols such as ethanol, and, preferably, polyhydroxy aliphatic compounds, for example, glycerine, propylene glycol, sorbitol, glucose, etc. The quantity of stabilizing agent employed will depend, in part, on the particular stabilizing agent chosen. For example, ethanol is preferably used in a concentration of about 10 percent, glycerine and propylene glycol can be used in the range of from about 5 to 50 percent, and sorbitol and glucose can be used in the range of from about 5 to about 20 percent. About 20 percent propylene glycol is preferred in the practice of the invention. A requirement of the hydroxy-containing compound used as a stabilizing agent is that it be water soluble within the concentration range required, and that it be parenterally acceptable.

Since the diluent of the invention is to be used by the physician to form a solution of chlordiazepoxide for parenteral injection immediately prior to use, it is desirable to include a preservative to help prevent bacterial contamination. The preservative should, of course, be pharmaceutically acceptable and the quantity of preservative employed will depend, in part, on the particular preservative chosen. For example, when phenol is employed it can be used in the range of from about 0.25 to about 0.5 percent; cresol in the range of from about 0.2 to about 0.5 percent; methyl and propyl p-hydroxybenzoates in a total of about 0.2 percent; thimerosal about 0.01 percent; benzyl alcohol from about 0.5 to about 2 percent, etc. Benzyl alcohol in a concentration of about 1.5 percent is preferred.

The invention, in another of its aspects, relates to a solution of chlordiazepoxide or the hydrochloride salt thereof in a diluent of the invention. The quantity of diluent employed, based on chlordiazepoxide, is such that from about 0.5 to about 2 moles, preferably about an equimolar quantity of maleic acid is present per mole of chlordiazepoxide.

It should be noted that maleic acid is a necessary component in the diluent solution containing chlordiazepoxide and that other related acids are not equivalent thereto. Acids such as nitric, sulfuric, acetic, lactic, adipic, malic, citric, glucuronic, glutamic, galaturonic, pyroglutamic, and tartaric acid are inoperable in the practice of the invention since they do not form readily soluble salts or complexes with chlordiazepoxide. Ascorbic acid forms a readily soluble salt, but is not as useful as maleic acid due to the fact that it is less stable than maleic acid in the diluents of the invention.

The solutions of chlordiazepoxide prepared in accordance with the invention are useful for parenteral injection for the relief of acute agitation and hyperactivity, and are indicated where rapid action is required or oral administration is not feasible.

The quantity of a parenteral chlordiazepoxide solution of the invention which is administered to a patient will depend on the particular diagnosis, the response of the patient, the age and body weight of the patient, etc. In a typical adult dosage a sufficient quantity of parenteral solution of chlordiazepoxide will be given to provide from about 25 to about 250 mg., e.g. about 50 to about 100 mg. of chlordiazepoxide.

The invention will be better understood from the following examples which are given for illustration purposes only and are not meant to limit the invention.

*Example 1*

A diluent suitable for parenteral use is prepared by forming an aqueous solution of the following ingredients:

| | Each ml. |
|---|---|
| Polyoxyethylene (20) sorbitan mono-oleate __mg__ | 40 |
| Benzyl alcohol _____mg__ | 15 |
| Maleic acid _____mg__ | 16 |
| Sodium hydroxide _____mg__ | 5.2 |
| Propylene glycol _____ml__ | 0.20 |
| Sterile water for injection, q.s. to 1 ml. | |

In the above formulation sodium hydroxide is present to adjust the pH to about 2.8, which is within the desired range, i.e. the range of from about 2.2 to about 3.5, preferably about 3.

Two ml. of the above diluent is then mixed with 100 mg. of chlordiazepoxide hydrochloride. The resulting solution of chlordiazepoxide, which is readily obtained by gently agitating the chlordiazepoxide hydrochloride in the diluent, is suitable for parenteral injection, e.g. intramuscularly.

It is to be noted that chlordiazepoxide hydrochloride is soluble in the above diluent up to a concentration of 250 mg./ml. of diluent, while the solubility of chlordiazepoxide hydrochloride in distilled water at the same pH (2.8, adjusted with NaOH) is only 50 mg./ml. of water.

*Example 2*

50 ml. of sterile water for injection at 25° C. is mixed with 16 ml. of propylene glycol. To this is added 1.2 g. of benzyl alcohol, 3.2 g. of polyoxyethylene (20) sorbitan mono-oleate, and 1.28 g. of maleic acid with stirring. Then a 10 percent sodium hydroxide solution is added slowly until a pH of 3.0±0.1 is obtained (about 4.16 ml. NaOH solution). Thereafter, sterile water for injection is added to form 80 ml. of solution. The solution is then thoroughly mixed, filtered, and filled into sterile ampules. The air in the ampules is replaced with nitrogen and the ampules sealed. The ampules are sterilized for 30 minutes at 100° C. The ampules are now suitable for use by the physician for mixing with chlordiazepoxide (or the hydrochloride salt thereof). Chlordiazepoxide hydrochloride is the generally used commercial product.

*Example 3*

A diluent suitable for parenteral use is prepared according to the formula of Example 1 except that Pluronic F-68 is used in place of polyoxyethylene (20) sorbitan mono-oleate.

*Example 4*

The process of Example 2 is repeated except that Pluronic F-68 is employed in place of polyoxyethylene (20) sorbitan mono-oleate.

Variations in the process of the invention can be undertaken by those skilled in the art without departing from either the scope or spirit of the invention.

We claim:

1. An aqueous diluent for chlordiazepoxide and the hydrochloride salt thereof suitable for parenteral injection comprising from about 0.25 to about 2.5 percent maleic acid, from about 0.5 to about 8.0 percent of a surfactant selected from the group consisting of (a) a solid block polymer having a molecular weight of about 8750 and composed of 80 percent by weight of polyoxyethylene groups and 20 percent by weight of polyoxypropylene groups wherein the polyoxyethylene groups are in the terminal portions of the molecules, (b) polyoxyethylene sorbitan monolaurate, and (c) polyoxyethylene sorbitan mono-oleate, and from about 5 to about 50 percent of a hydroxy-containing aliphatic stabilizing agent selected from the group consisting of a $C_2$-$C_6$ alkanol, glycerine, propylene glycol, sorbitol, and glucose, the precentage being based on the total weight of diluent.

2. A diluent according to claim 1 which contains a small quantity of a preservative selected from the group consisting of phenol, cresol, methyl-p-hydroxybenzoate, propyl-p-hydroxybenzoate, thimerosal, and benzyl alcohol.

3. A composition according to claim 1 wherein the quantity of maleic acid is from 0.8 to 2.0 percent and, the surfactant is from about 1 to about 8 percent.

4. A composition according to claim 1 which contains a compound selected from the group consisting of chlordiazepoxide and the hydrochloride salt thereof in a quantity such that the solution contains from about 0.5 to about 2 moles of maleic acid per mole of chlordiazepoxide.

5. A composition according to claim 1 wherein the quantity of maleic acid is from 0.8 to 2.0 percent; the surfactant is present in from about 1 to about 8 percent; and the stabilizing agent is propylene glycol present in from about 5 to about 50 percent, the percentage ranges being based on the total weight of diluent.

6. A composition according to claim 5 comprising about 1.5 percent maleic acid, about 4 percent surfactant, and about 20 percent propylene glycol.

7. A composition according to claim 6 which also contains about 1.5 percent benzyl alcohol.

References Cited by the Examiner

UNITED STATES PATENTS

| | | | |
|---|---|---|---|
| 2,274,593 | 2/1942 | Despois | 167—65 X |
| 2,669,563 | 2/1954 | Ruskin | 167—65 X |
| 2,836,541 | 5/1958 | Lager | 167—65 X |
| 2,868,802 | 1/1959 | Hueni | 167—58.1 X |
| 2,893,992 | 7/1959 | Sternbach | 167—65 X |
| 2,963,403 | 12/1960 | Hiestand | 167—65 X |
| 3,070,499 | 12/1962 | Mullins et al. | 167—65 X |

OTHER REFERENCES

Koppanyi: Federation Proceedings, vol. 9, No. 1, pages 291–292, March 1950.

LEWIS GOTTS, *Primary Examiner*

FRANK CACCIAPAGLIA, JR., *Examiner.*